US 11,472,724 B2

(12) United States Patent
Kleinguetl et al.

(10) Patent No.: US 11,472,724 B2
(45) Date of Patent: Oct. 18, 2022

(54) METHODS AND SYSTEMS FOR OIL IN WATER SEPARATION USING OIL SPECIFIC VISCOSIFIER COMPOSITION

(71) Applicant: Halliburton Energy Services, Inc., Houston, TX (US)

(72) Inventors: Kevin G. Kleinguetl, Kingwood, TX (US); Brice Aaron Jackson, Houston, TX (US); Lawrence Joseph Herskowitz, Pearland, TX (US); Adam Dotson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 173 days.

(21) Appl. No.: 16/500,691

(22) PCT Filed: Nov. 26, 2018

(86) PCT No.: PCT/US2018/062414
§ 371 (c)(1),
(2) Date: Oct. 3, 2019

(87) PCT Pub. No.: WO2020/112075
PCT Pub. Date: Jun. 4, 2020

(65) Prior Publication Data
US 2021/0246053 A1   Aug. 12, 2021

(51) Int. Cl.
*C02F 1/68* (2006.01)
*C02F 1/40* (2006.01)
(Continued)

(52) U.S. Cl.
CPC .......... *C02F 1/68* (2013.01); *C02F 1/40* (2013.01); *C02F 1/52* (2013.01); *C02F 2101/32* (2013.01); *C02F 2103/10* (2013.01)

(58) Field of Classification Search
CPC ........................................................ E21B 43/16
(Continued)

(56) References Cited

U.S. PATENT DOCUMENTS

| 6,132,630 A * | 10/2000 | Briant | B01D 17/00 |
| | | | 210/774 |
| 7,037,881 B2 * | 5/2006 | Growcock | C09K 8/12 |
| | | | 507/102 |

(Continued)

FOREIGN PATENT DOCUMENTS

| WO | WO-8802434 A1 * | 4/1988 | ............... C09K 8/82 |
| WO | WO-9726310 A1 * | 7/1997 | ............... C09K 8/08 |

(Continued)

OTHER PUBLICATIONS

International Search Report and Written Opinion issued in related PCT Application No. PCT/US2018/062414 dated Aug. 23, 2019, 12 pages.

(Continued)

*Primary Examiner* — Nina Bhat
(74) *Attorney, Agent, or Firm* — Kilpatrick Townsend & Stockton LLP

(57) ABSTRACT

Systems and methods for treating wastewater with an oil-specific viscosifier composition and separating viscosified oil, undissolved solids and/or particulates, and/or other waste materials in such wastewater are provided. The methods further include: providing wastewater that includes oil; mixing the wastewater with an oil-specific viscosifier composition to form a viscosified oil; and separating at least a portion of the viscosified oil from the wastewater to provide treated water.

18 Claims, 1 Drawing Sheet

(51) Int. Cl.
    *C02F 1/52*     (2006.01)
    *C02F 101/32*   (2006.01)
    *C02F 103/10*   (2006.01)

(58) Field of Classification Search
    USPC ........ 210/708, 723, 747.8, 799; 366/50, 266
    See application file for complete search history.

(56) References Cited

U.S. PATENT DOCUMENTS

| | | | | |
|---|---|---|---|---|
| 8,920,640 | B2* | 12/2014 | Jauncey | B63B 35/32 |
| | | | | 210/109 |
| 9,511,309 | B2* | 12/2016 | Itahashi | B01D 1/222 |
| 9,663,704 | B2* | 5/2017 | Favero | C09K 8/588 |
| 9,840,903 | B2* | 12/2017 | Smith | E21B 43/40 |
| 10,760,399 | B2* | 9/2020 | Hendou | C02F 1/444 |
| 2012/0228229 | A1* | 9/2012 | Douglas | C02F 1/5245 |
| | | | | 210/662 |
| 2013/0168323 | A1* | 7/2013 | Soane | B01D 17/0202 |
| | | | | 210/691 |
| 2014/0042099 | A1* | 2/2014 | Nedwed | C02F 1/682 |
| | | | | 210/698 |
| 2015/0266991 | A1* | 9/2015 | Li | C08F 292/00 |
| | | | | 210/729 |
| 2016/0060148 | A1* | 3/2016 | Mason | C02F 1/76 |
| | | | | 210/717 |
| 2016/0214037 | A1* | 7/2016 | Li | C02F 1/56 |
| 2017/0233639 | A1* | 8/2017 | Hendou | C02F 1/40 |
| | | | | 166/267 |

FOREIGN PATENT DOCUMENTS

| | | | | |
|---|---|---|---|---|
| WO | WO-2015122887 | A1* | 8/2015 | E21B 43/16 |
| WO | 2015/154167 | A1 | 10/2015 | |

OTHER PUBLICATIONS

International Preliminary Report on Patentability issued in related PCT Application No. PCT/US2018/062414 dated Jun. 10, 2021, 9 pages.

* cited by examiner

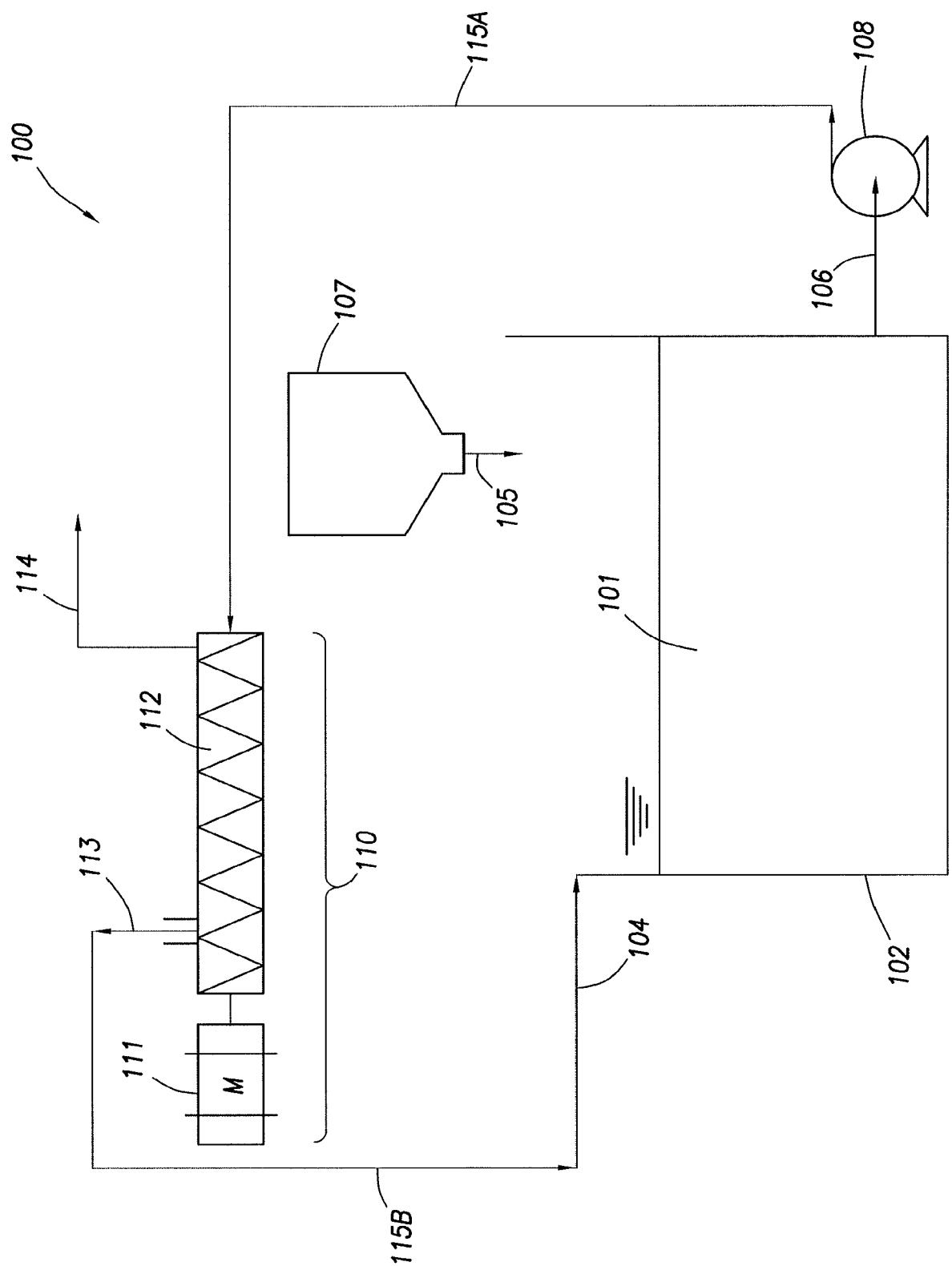

METHODS AND SYSTEMS FOR OIL IN WATER SEPARATION USING OIL SPECIFIC VISCOSIFIER COMPOSITION

CROSS-REFERENCE TO RELATED APPLICATION

The present application is a U.S. National Stage Application of International Application No. PCT/US2018/062414 filed Nov. 26, 2018, which is incorporated herein by reference in its entirety for all purposes.

BACKGROUND

The present disclosure relates to systems and methods for treating oil-containing wastewater such as water that has been used and/or recovered in conjunction with subterranean operations.

Various types of subterranean well bore operations (e.g., fracturing, drilling, etc.) sometimes generate large volumes of wastewater, such as produced water, surface water, flowback water, and the like. Typically, this wastewater is collected into various ponds, sumps, or tanks at a job site and eventually transferred to a main holding area or sump. From here, the water may be transferred to a water treatment plant for processing before discharge to the environment. Wastewater and effluent may contain a variety of components. The wastewater often includes an oil and an aqueous fluid, which is either indigenous to the subterranean formation or mine site or a by-product of a mining or well treatment operation. Wastewater also may be produced by other processes and/or equipment at a job site, including but not limited to rainwater and deck drainage, as well as water used as a coolant, washdown or cleaning fluid, storm water, and/or other surface operations.

Moreover, certain drilling fluids may include invert emulsion fluids, i.e., emulsions in which the non-oleaginous fluid is the discontinuous phase and the oleaginous fluid is the continuous phase. During the drilling process, it is not uncommon for such invert emulsion drilling fluids to encounter a water bearing formation, which may alter the ratio of oleaginous fluid to non-oleaginous fluid. In some cases, emulsions that are difficult to break may form in the fluid. The recovered drilling fluid also may include other waste materials such as oils and/or particulate materials suspended therein. Many offshore rigs drilling with oil-based drilling fluids may produce significant amounts of wastewater that includes oil, dissolved and undissolved salts, coarse and fine undissolved solids and/or particulates in this way. The wastewater usually may not be directly discharged into the sea because of its hydrocarbon content, which is usually higher than regulatory limits. Therefore, wastewater is often transported in containers to shore for disposal according to the local regulations or treated to remove contaminants before the remaining clean water is either discharged or reused. The transportation of waste materials and/or untreated wastewater can be costly and/or increase the operational complexity of offshore drilling operations.

BRIEF DESCRIPTION OF THE DRAWINGS

These drawings illustrate certain aspects of some of the embodiments of the present disclosure and should not be used to limit or define the claims.

FIG. 1 is a diagram illustrating a portion of a wastewater treatment system in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of the present disclosure. Furthermore, in no way should the following examples be read to limit, or define, the scope of the disclosure.

The present disclosure relates to systems and methods for treating wastewater such as water that has been used and/or recovered in conjunction with subterranean operations. More particularly, the present disclosure relates to systems and methods for treating wastewater with an oil-specific viscosifier composition and separating viscosified oil, undissolved solids and/or particulates, and/or other waste materials in such wastewater.

Among the many potential advantages to the methods and compositions of the present disclosure, only some of which are alluded to herein, the methods, compositions, and systems of the present disclosure may reduce the volume of waste at a job site. In some embodiments, this may, among other benefits, reduce the costs associated with transporting untreated wastewater off-site for treatment and/or disposal. In some embodiments, the methods and systems of the present disclosure also may increase the amount of fresh water available for reuse in subsequent subterranean operations. In some embodiments, this may, among other benefits, reduce the amounts and/or concentrations of contaminants in wastewater sufficiently to re-use that treated wastewater in subsequent operations (e.g., as a fracturing fluid, completion brine, etc.) at the same well site or job site where it was recovered. In some embodiments, this may reduce or eliminate the cost associated with transporting fresh water to the well site or job site for such operations.

For the purposes of this disclosure, the term "communicatively coupled" as used herein is intended to mean coupling of components or subsystems (e.g., an information handling subsystem, treatment subsystem, or a component such as an interface or controller thereof) in a way to permit communication of information therebetween. Two components or subsystems may be communicatively coupled through a wired or wireless communication network, including but not limited to Ethernet, LAN, fiber optics, radio, microwaves, satellite, and the like. Operation and use of such communication networks is well known to those of ordinary skill in the art and will, therefore, not be discussed in detail herein.

In the systems and methods of the present disclosure, wastewater may include any water or effluent collected at a job site that includes water and waste materials such as emulsions, oils, and/or dissolved or undissolved particulate material. The wastewater treated using the methods and/or systems of the present disclosure may include any aqueous fluid from any source, including but not limited to water or another aqueous fluid recovered from a subterranean formation at a job site. The wastewater may include water or other aqueous fluids that had been used as treatment fluids in the formation, naturally occurring water or other aqueous fluids residing in the formation, or a combination thereof. The wastewater treated using the methods and/or systems of the present disclosure may include oil.

In those embodiments, the wastewater may be recovered from the subterranean formation in conjunction with any type of subterranean operation or treatment, including but not limited to hydraulic fracturing treatments, acidizing treatments, and drilling operations. In certain embodiments, a drilling fluid may be introduced into a subterranean formation while drilling at least a portion of a well bore that penetrates a subterranean formation, and the drilling fluid may serve a number of purposes, including but not limited to suspending and circulating drill cuttings out of the well bore, cooling and/or lubricating a drill bit, and the like. The drilling fluid or a portion thereof then may be circulated out of the well bore during or after its use. Wastewater also may be produced by other processes and/or equipment at a job site, including but not limited to rainwater and deck drainage, as well as water used as a coolant, cleaning fluid, and/or other surface operations. Once the oil and other waste materials are separated and removed from the wastewater, the treated water may be re-used in one or more of the operations listed above. For example, in some embodiments, the treated water may be pumped into a mud pit where drilling fluids are prepared and/or held prior to use. The treated water may be mixed with one or more additional components in the mud pit and then pumped out into a drillstring or coiled tubing that is used to drill at least a portion of a well bore penetrating a subterranean formation (e.g., the same subterranean formation from which the wastewater was recovered).

In the methods of the present disclosure, the wastewater is treated with an oil-specific viscosifier composition. As used herein, the term, "oil-specific viscosifier composition" refers to a chemical additive that increases the viscosity of the oil present in wastewater, in some cases, without substantially increasing the viscosity of the water therein. Examples of oil-specific viscosifier compositions that may be suitable for certain embodiments of the present disclosure include, but are not limited to hydrocarbon copolymers, organophilic clay, crystalline silicas, minerals, natural fatty acids, synthetic fatty acids, ethylene, clay, amines, and any combination thereof. In certain embodiments KRATON polymer (available from Kraton Polymers Inc., Houston, Tex.) or BARARESIN®-VIS suspension agent (available from Baroid, Houston, Tex.) may be suitable for certain embodiments of the present disclosure. In some embodiments, the oil-specific viscosifier composition may be added to the wastewater in an amount from 0.1 pounds per barrel (ppb) up to about 15.0 ppb. In some embodiments, the oil-specific viscosifier composition may be added to the wastewater in an amount from about 0.25 ppb up to about 1.0 ppb. In some embodiments, the oil-specific viscosifier composition may be added to the wastewater in an amount from about 10.0 ppb up to about 12.0 ppb.

In certain embodiments, one or more additional chemical additives such as a demulsifer optionally may be used to treat the wastewater. In certain embodiments, the wastewater is pre-treated with the demulsifier before treating the wastewater with the oil-specific viscosifier composition. In some embodiments, the wastewater is pre-treated with the demulsifier based on considerations such as the emulsion strength of the wastewater. For example, wastewater that contains a high concentration of certain additives may possess a relatively higher emulsion strength. Examples of demulsifiers that may be suitable for use in certain embodiments of the present disclosure include, but are not limited to, acid catalyzed phenol-formaldehyde resins, base catalyzed phenol-formaldehyde resins, dendrimers, di-epoxides, epoxy resins, polyethyleneimines, polyamines, polyols, propoxypropanol, any combination thereof, and any derivative thereof. In certain embodiments, a flocculant may be used together with the oil-specific viscosifier composition. In certain embodiments, the wastewater is treated with a flocculant before separating certain components of the wastewater. Examples of flocculants that may be suitable for use in certain embodiments of the present disclosure include, but are not limited to, alginates, alum, aluminum chlorohydrate, aluminum sulphate, calcium oxide, calcium hydroxide, chitosan, gelatin, guar gum, iron(II) sulphate (ferrous sulphate), iron(III) chloride (ferric chloride), isinglass, moringa oleifera seeds, polyacrylamide, polyDADMAC, sodium aluminate, sodium silicate, strychnos potatorum seeds, any combination thereof, and any derivative thereof.

In certain embodiments, other chemical additives used in the methods of the present disclosure may include the use of any chemical additives known in the art for treating wastewater. Examples of other chemical additives that may be suitable include, but are not limited to, surfactants (e.g., foamers, defoamers, emulsifiers, demulsifiers), pH adjusters (e.g., buffers, acids, bases), biocides, coagulants, corrosion inhibitors, oxygen scavengers, sulfide scavengers, scale inhibitors, and any combinations thereof. A person skilled in the art, with the benefit of this disclosure, will recognize the types of additional additives that may be included in the fluids of the present disclosure for a particular application. In some embodiments, the chemical additives may involve the addition of such additives to and/or reaction of such additives with components of the wastewater at one or more different parameters, all of which may be varied in different chemical treatments. Examples of such parameters include, but are not limited to, temperature, static pressure, pressure drop, shear rate, flow rate, additive concentration, additive dosing rate, residence time (e.g., time that the additive is allowed to react with components of the wastewater before other treatments are performed), and any combinations thereof.

Some embodiments may include a treatment system for performing the system and methods of the present disclosure. In some embodiments, the treatment system may include one or more chemical and/or mechanical treatment subsystems, which may include any vessels (e.g., tanks), conduits, or other devices suitable for conducting those treatments, and may be of any suitable shape and size for holding and/or treating wastewater.

In some embodiments, the treatment systems of the present disclosure may be located, and the treatment methods may be performed, on an offshore rig or ship that is engaged in offshore subterranean operations, such as a drilling rig or drill ship. In other embodiments, the treatment systems may be located, and the treatment methods may be performed, at a land-based job site. The various components of the treatment systems discussed herein, as well as any other components of those systems, may be housed together in a single unit, or may be provided as one or more separate modules or tanks that may be connected and/or otherwise used together to perform different portions of the treatment process.

In some embodiments, the vessels in these subsystems may include a tank. The tank may include one or more inlets through which wastewater may flow into the tank, and one or more outlets through which water may be released after at least a portion of the waste materials such as oils, emulsions, and/or particulate material in the wastewater have been removed. Any suitable valves, pumps, or other devices may be used for controlling the flow of water through the inlets and/or outlets of the tank. In some embodiments, the tank may be equipped with one or more agitation devices such as rotary stirring rods, paddles, blades, air nozzles, etc. that are configured to stir, mix, and/or agitate the contents of the tank and, in some instances, promote the separation of water and waste materials in the tank.

In some embodiments, these vessels and/or conduits also may be equipped with arrays of sensors for detecting various types of phenomena (e.g., condition of certain equipment therein, flow of fluids, etc.) or properties of a fluid in the vessel and/or conduit. In some embodiments, the chemical treatment subsystems may include one or more additive storage containers and/or hoppers for holding and/or dispensing chemical additives into the wastewater in the vessel or conduit of that subsystem, or other actuatable components such as pumps, agitators, skimmers, filters, centrifuges, heaters, electrical current generators, and the like. For example, the oil-specific viscosifier composition may be dispensed from a chemical treatment subsystem that includes one or more chemical additive hoppers configured to dispense chemical additives into chemical treatment tanks. In some embodiments, the chemical additive containers, hoppers and/or other actuatable components may be communicatively coupled to an information handling system and actuated or otherwise controlled by signals received from the information handling system without the need for human intervention or action directed to that action.

In some embodiments, an information handling subsystem communicatively coupled to a test treatment subsystem (if present), the chemical treatment subsystem, and the mechanical treatment subsystems. The information handling system may be configured to receive data from sensors, select at least one chemical treatment and at least one mechanical treatment based on the data to reduce the amount of one or more waste materials in the untreated wastewater, control one or more components of at least one chemical treatment subsystem to perform the selected chemical treatment on the untreated wastewater, and control one or more components of at least one mechanical treatment subsystem to perform the selected mechanical treatment on the wastewater.

The oil-specific viscosifier composition and wastewater may be mixed using any suitable method and/or equipment known in the art at any time prior to their use. For example, the chemical treatment subsystem may include one or more chemical treatment tanks, each of which may equipped with agitation devices (e.g., rotary stirring rods, paddles, blades, air nozzles, etc.). Each chemical treatment subsystem may also include equipment such as heaters, coolant systems, and the like that may be used to control various conditions in the treatment tanks.

The mechanical treatments used in the methods and systems may include any flow shearing techniques known in the art for separating oil from the wastewater recovered at a well site or job site. Examples of such techniques that may be suitable include, but are not limited to, rotating conveyance augers, pipe flow regimes, centrifugal spin out platforms, counterflow conveyers, skimmer arms, paddles mixers, filters, and any combinations thereof.

The mechanical treatments used in the methods and systems may include any additional techniques known in the art for separating waste materials from wastewater recovered at a well site or job site. Examples of such techniques that may be suitable include, but are not limited to, dissolved air flotation, skimming, filtration, reverse osmosis, settling, centrifuging, electric field application, electrocoagulation, and any combinations thereof. For example, some embodiments of the present disclosure may include filtering undissolved solids and/or particulates from the wastewater. In some embodiments, the mechanical treatments may involve performing certain actions with the wastewater at one or more different parameters, all of which may be varied in different mechanical treatments. Examples of such parameters include, but are not limited to, temperature, pressure, electric field strength, flow rate, centrifuge speed, residence time (e.g., time that the additive is subjected to the mechanical treatment), filter material and/or pore size, and any combinations thereof. For example, some embodiments of the present disclosure may include heating the wastewater and chemical additives before separating the viscosified oil and/or other waste materials from the wastewater.

The waste materials separated from the wastewater in this way then may be placed in a container for disposal or transport. The recovered viscosified oil may be reused for creating new drilling muds, roads construction material, or other oil-based products. The remaining treated water may be further treated, discharged, and/or reused in subsequent operations (e.g., further subterranean operations at the same job site from which the wastewater was recovered). For example, in some embodiments, the treated water may be pumped into a mud pit where drilling fluids are prepared and/or held prior to use. The treated water may be mixed with one or more additional components in the mud pit and then pumped out into a drillstring or coiled tubing that is used to drill at least a portion of a well bore penetrating a subterranean formation (e.g., the same subterranean formation from which the wastewater was recovered). In certain embodiments, the treated water may be transferred from the tank described above to another treatment vessel such as a reverse osmosis unit, for among other reasons, to remove any remaining viscosified oil, or to remove salts and/or other species dissolved in the water, after which the remaining fresh water may be discharged, and/or reused in subsequent operations.

In some embodiments, treatment of the wastewater with oil-specific viscosifier compositions may be automated and/or implement a feedback system. Sensors may be used to assess the oil content of the untreated wastewater and one or more other properties of the untreated wastewater. Based on the assessment, one or more chemical treatments and/or one or more mechanical treatments may be performed on the untreated wastewater or a sample thereof. In some embodiments, the chemical treatments and/or mechanical treatments performed on the wastewater sample may be selected, at least in part, based on the properties of the untreated wastewater. The sampling, measuring, and treatment of wastewater samples may be repeated for any suitable number of different chemical and mechanical treatments. Based at least in part on the data regarding the properties of the treated sample(s), an information handling system such as a computer may select at least one chemical treatment and at least one mechanical treatment to reduce the amount of one or more waste materials in the untreated wastewater, and control one or more components of at least one chemical treatment subsystem and at least one mechanical treatment subsystem to perform the selected chemical and mechanical treatment on the untreated wastewater.

A portion of a wastewater treatment system 100 according to certain aspects of the present disclosure is shown in FIG. 1. The treatment system 100 is typically located at a well site, but alternatively may be deployed at other locations where wastewater carrying waste materials such as oils, emulsions, solids and/or particulate materials is treated. In some embodiments, the treatment system 100 may be located on an offshore rig or ship that is engaged in offshore subterranean operations, such as a drilling rig or drill ship. In other embodiments, the treatment system 100 may be located at a land-based job site. The components of the wastewater treatment system 100 of the present disclosure as shown in the FIGURE, as well as any other components of that system, may be housed together in a single unit, or may be provided as one or more separate modules or tanks that may be connected and/or otherwise used together to perform different portions of the treatment process.

Referring now to FIG. 1, treatment system 100 for wastewater 101 generally includes a tank 102 in which the wastewater 101 may be deposited after use in a subterranean operation such as a drilling operation. The tank may include a bottom surface and at least one side wall, but otherwise may be of any suitable shape and size for holding and/or treating wastewater from the applicable treatment operations. As shown, tank 102 includes an inlet 104 in the side wall of the tank through which wastewater 101 may flow into the tank, and an outlet 106 through which wastewater 101 treated with an oil-specific viscosifier composition may be released. In some embodiments, the tank 102 may be located in or associated with a treatment system that includes other tanks, vessels, and/or conduits upstream or downstream of tank where the wastewater 101 may be subjected to other treatments such as chemical treatments. In some embodiments, tank 102 may include a dissolved air flotation unit, prior to which chemicals that bind and/or flocculate particulates in the wastewater 101 may be added, making them easier to mechanically separate from the wastewater 101. After the wastewater has been chemically treated, it may flow into the tank 102 through the inlet 104.

In operating the system shown in FIG. 1, wastewater 101 that contains some amount of waste materials such as oils, emulsions, and/or particulate material may flow into the tank 102 via the inlet 104. In some embodiments, the wastewater 101 may be treated with the oil-specific viscosifier composition 105, and optionally, mechanical treatments, and/or other chemical additives (e.g., demulsifiers, flocculants, and/or coagulants) in tank 102 or before the wastewater 101 is placed in the tank 102. In the illustrated embodiment, a hopper 107 may add the oil-specific viscosifier composition 105 and/or other chemical additives to the wastewater 101 in the tank 102. In some embodiments, the wastewater 101 may be treated with a flocculant and/or a coagulant causing the viscosified oil to form droplets.

Any suitable valves, pumps, or other devices may be used for controlling fluid flow through inlet 104 and outlet 106. In the illustrated embodiment, a pump 108 coupled to the outlet 106 controls fluid flow in and out of the tank 102. In the illustrated embodiment, the pump 108 is also coupled to an auger separator 110. The auger separator 110 includes a motor 111, an auger screw 112, a first outlet 113 for directing treated water, a second outlet 114 for viscosified oil. The terms "couple" or variations thereof, as used herein, are intended to mean either an indirect or a direct connection. Thus, if a first device is coupled to a second device, that connection may be through a direct connection or through an indirect via other devices, conduits, and/or connections. For example, the tank 102, pump 108, and auger separator 110 may be coupled via a system of pipes 115A and 115B. Once the oil-specific viscosifier composition 105 has been added to the tank 102, the pump 108 pumps the wastewater 101 from the tank 102 through the auger separator 110 via the system of pipes 115A and 115B. In some embodiments, such as the illustrated embodiment, the tank 102, pump 108, and auger separator 110, and pipes 115A and 115B may form a feedback loop.

Treatment system 100 includes one or more devices that mix the oil-specific viscosifier composition 105 and the wastewater 101. In the illustrated embodiment, the pump 108 and auger separator 110 mix the oil-specific viscosifier composition 105 with the wastewater 101 and separate the viscosified oil. First, the pump 108 and/or the auger separator 110 may stir the mixture to disperse the oil-specific viscosifier composition 105 throughout the wastewater 101 as the mixture flows out of the tank 102. As the oil-specific viscosifier composition 105 disperses throughout the wastewater 101, the oil-specific viscosifier composition 105 may then act to viscosify the oil contained in the wastewater 101. In some embodiments, another type or combination of mixing devices coupled to the tank 102, directly and/or indirectly, may function to mix the oil-specific viscosifier composition 105.

Treatment system 100 further includes one or more devices configured to create shear flow conditions that separate components of wastewater 101 based on the relative viscosities of the various components, including but not limited to rotating conveyance augers, pipe flow regimes, centrifugal spin out platforms, counterflow conveyers, skimmer arms, paddles mixers, filters, etc. In the embodiment shown, the flow shear devices include the auger separator 110 and the system of pipes 115A and 115B. As the wastewater 101 and oil-specific viscosifier composition 105 mixture flows through pipes 115A and 115B and the auger separator 110, the shear flow created by these components achieves separation of the viscosified oil from the wastewater 101 based on the relative viscosities of the viscosified oil and the aqueous component of the wastewater 101. In some embodiments, as the shear flow causes the viscosified oil to separate from the wastewater 101, the viscosified oil may gel. In some embodiments, another type or combination of devices coupled to the tank 102, directly and/or indirectly, may function to separate viscosified oil.

In some embodiments, at least some of the viscosified oil clings to the auger screw 112 as the wastewater 101 flows through the auger separator 110. This viscosified oil may be collected from the screw via the second outlet 114 of the auger separator 110. The wastewater 101 including any remaining viscosified oil that does not cling to the auger screw 112, is directed to the first outlet 112 of the auger separator 110. In the illustrated embodiment, the first outlet 113 of the auger separator 110 is coupled to the inlet 104 of the tank 102 as a conduit for the wastewater 101 with remaining viscosified oil to enter the tank 102. In some embodiments, the first outlet 112 may direct the wastewater 101 with remaining viscosified oil to another tank 102 or vessel for additional treatments or for storage.

In some embodiments, the remaining viscosified oil directed back to the tank 102 may float to the top of the tank 102. In some embodiments, additional chemical additives such as a flocculant and/or a coagulant cause the viscosified oil to form droplets. This viscosified oil may be skimmed from the surface of the wastewater 101 or filtered when the wastewater 101 is pumped out of the tank 102. Any viscosified oil and other waste materials separated from the wastewater 101 along with the viscosified oil remaining in the tank 102 may be collected and placed in a disposal container for disposal or transport, leaving treated water in the tank 102. In some embodiments, the treated water then may be pumped out of the tank 102 through an additional outlet (not shown) and into another vessel, where it may be further treated or filtered in another treatment unit, for example, to remove salts or other species dissolved in the water.

In some embodiments, the additional outlet (not shown) of the tank 102 may release the treated water after waste materials such as oils, emulsions, and/or particulate material have been separated from the wastewater 101. The outlet may couple (e.g., via a conduit through which water may flow) the treatment system 100 to another vessel in which the treated water may be held for further treatment. The treatment system may further include a secondary treatment unit such as a reverse osmosis treatment unit, electrocoagulation unit, or a specialized filter that may be used, for example, to remove salts or other species dissolved in the water. The treatment system 100 may further include another vessel coupled to the secondary treatment unit for holding treated water for disposal, discharge, or further use. The treatment system 100 also optionally may include one or more pumps or other devices for moving water from the tank into vessel coupled to the tank containing the wastewater, secondary treatment unit, and/or the vessel coupled to the secondary treatment unit.

In some embodiments, the treated water stored in the subsequent vessel may be discharged or used in subsequent operations. For example, the treated water from the vessel may be pumped into a mud pit where drilling fluids are prepared and/or stored prior to use. The treated water may be mixed with one or more additional components in the mud pit and then pumped out into a drillstring or coiled tubing that is used to drill at least a portion of a well bore penetrating a subterranean formation (e.g., the same subterranean formation from which the wastewater was recovered).

An embodiment of the present disclosure is a method that includes providing wastewater that comprises oil; mixing the wastewater with an oil-specific viscosifier composition to form a viscosified oil; and separating at least a portion of the viscosified oil from the wastewater to provide treated water. In one or more of the embodiments above, the method includes a treatment system that includes (i) one or more mechanical treatment subsystems for mixing the oil-specific viscosifier composition in the wastewater and for separating the viscosified oil; and (ii) one or more chemical treatment subsystems for contacting the wastewater with the oil-specific viscosifier composition. In one or more of the embodiments above, the one or more chemical treatment subsystems include at least one tank. In one or more of the embodiments above, the one or more chemical treatment subsystems include at least one hopper for dispensing chemical additives. In one or more of the embodiments above, the one or more mechanical treatment subsystems include at least one flow shear device for separating the viscosified oil. In one or more of the embodiments above, the flow shear device is selected from the group consisting of: a rotating conveyance auger, a pipe flow regime, a centrifugal spin out platform, a counterflow conveyer, a skimmer arm, a paddles mixer, a filter, and any combination thereof. In one or more of the embodiments above, the method includes treating the wastewater with a demulsifier before separating the viscosified oil. In one or more of the embodiments above, the oil-specific viscosifier composition is provided in an amount such that the compound is present in the wastewater in an amount from about 0.1 to about 1.0 pounds per barrel (ppb). In one or more of the embodiments above, the oil-specific viscosifier composition comprises at least one additive from a group consisting of: a hydrocarbon copolymer, an organophilic clay, a crystalline silica, a mineral, a natural fatty acid, a synthetic fatty acid, ethylene, a clay, an amine, and any combination thereof. In one or more of the embodiments above, the method includes heating the wastewaster and the oil-specific viscosifier composition before separating the viscosified oil. In one or more of the embodiments above, the method includes contacting the wastewater with a flocculant before separating the viscosified oil. In one or more of the embodiments above, the method includes disposing of or reusing the treated water after separating the viscosified oil from the wastewater. In one or more of the embodiments above, the method includes separating and removing undissolved solids, undissolved particulates, or any combination thereof, from the wastewater or treated water before, during or after mixing the wastewater with the oil-specific viscosifier composition. In one or more of the embodiments above, the method includes using the viscosified oil in one or more operations. In one or more of the embodiments above, the wastewater comprises water recovered from at least a portion of a subterranean formation. In one or more of the embodiments above, the wastewater comprises a washdown fluid collected at a job site. In one or more of the embodiments above, the method is performed at a job site.

Another embodiment of the present disclosure is a method that includes recovering wastewater from at least a portion of a subterranean formation, wherein the wastewater comprises oil; mixing the wastewater with an oil-specific viscosifier composition to form a viscosified oil; separating at least a portion of the viscosified oil from the wastewater to provide treated water; and using the viscosified oil in one or more operations in the subterranean formation. In one or more of the embodiments above, the method includes disposing of or reusing the treated water after separating the viscosified oil from the wastewater. In one or more of the embodiments above, the oil-specific viscosifier composition comprises at least one additive from a group consisting of: a hydrocarbon copolymer, an organophilic clay, a crystalline silica, a mineral, a natural fatty acid, a synthetic fatty acid, ethylene, a clay, an amine, and any combination thereof.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing wastewater that comprises oil;
mixing the wastewater with an oil-specific viscosifier composition to form a viscosified oil without substantially increasing a viscosity of water within the wastewater; wherein the oil-specific viscosifier composition is selected from the group consisting of a hydrocarbon copolymer, an organophilic clay, a crystalline silica, a mineral, a natural fatty acid, a synthetic fatty acid, ethylene, a clay, an amine and combinations thereof and
separating at least a portion of the viscosified oil from the wastewater to provide treated water.

2. The method of claim 1 further comprising a treatment system that includes (i) one or more mechanical treatment subsystems for mixing the oil-specific viscosifier composition in the wastewater and for separating the viscosified oil; and (ii) one or more chemical treatment subsystems for contacting the wastewater with the oil-specific viscosifier composition.

3. The method of claim 2 wherein the one or more chemical treatment subsystems include at least one tank.

4. The method of claim 2 wherein the one or more chemical treatment subsystems include at least one hopper for dispensing chemical additives.

5. The method of claim 2 wherein the one or more mechanical treatment subsystems include at least one flow shear device for separating the viscosified oil.

6. The method of claim 5 wherein the flow shear device is selected from the group consisting of: a rotating conveyance auger, a pipe flow regime, a centrifugal spin out platform, a counterflow conveyer, a skimmer arm, a paddles mixer, a filter, and any combination thereof.

7. The method of claim 1 further comprising treating the wastewater with a demulsifier before separating the viscosified oil.

8. The method of claim 1 wherein the oil-specific viscosifier composition is provided in an amount such that the compound is present in the wastewater in an amount from about 0.1 to about 1.0 pounds per barrel (ppb).

9. The method of claim 1 further comprising heating the wastewater and the oil-specific viscosifier composition before separating the viscosified oil.

10. The method of claim 1 further comprising contacting the wastewater with a flocculant before separating the viscosified oil.

11. The method of claim 1 further comprising disposing of or reusing the treated water after separating the viscosified oil from the wastewater.

12. The method of claim 1 further comprising separating and removing undissolved solids, undissolved particulates, or any combination thereof, from the wastewater or treated water before, during or after mixing the wastewater with the oil-specific viscosifier composition.

13. The method of claim 1 further comprising using the viscosified oil in one or more operations.

14. The method of claim 1 wherein the wastewater comprises the water recovered from at least a portion of a subterranean formation.

15. The method of claim 1 wherein the wastewater comprises a washdown fluid collected at a job site.

16. The method of claim 1, wherein the method is performed at a job site.

17. A method comprising:
recovering wastewater from at least a portion of a subterranean formation, wherein the wastewater comprises oil;
mixing the wastewater with an oil-specific viscosifier composition to form a viscosified oil without substantially increasing a viscosity of water within the wastewater;
wherein the oil-specific viscosifier composition is selected from the group consisting of a hydrocarbon copolymer, an organophilic clay, a crystalline silica, a mineral, a natural fatty acid, a synthetic fatty acid, ethylene, a clay, an amine and combinations thereof
separating at least a portion of the viscosified oil from the wastewater to provide treated water; and
using the viscosified oil in one or more operations in the subterranean formation.

18. The method of claim 17 further comprising disposing of or reusing the treated water after separating the viscosified oil from the wastewater.

* * * * *